US012475859B2

(12) United States Patent
Lin et al.

(10) Patent No.: US 12,475,859 B2
(45) Date of Patent: Nov. 18, 2025

(54) DISPLAY WITH A BACKLIGHT MODULE COMPRISING A TARGET BLOCK AND AN ADJACENT BLOCK AND METHOD OF CONTROLLING THE SAME

(71) Applicant: NOVATEK Microelectronics Corp., Hsin-Chu (TW)

(72) Inventors: Yi-Tsung Lin, Hsinchu County (TW); Yen-Tao Liao, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/918,009

(22) Filed: Oct. 16, 2024

(65) Prior Publication Data

US 2025/0246159 A1 Jul. 31, 2025

(30) Foreign Application Priority Data

Jan. 29, 2024 (TW) ................................ 113103251

(51) Int. Cl.
*G09G 3/34* (2006.01)

(52) U.S. Cl.
CPC ... *G09G 3/3426* (2013.01); *G09G 2320/0247* (2013.01); *G09G 2320/064* (2013.01)

(58) Field of Classification Search
CPC .......... G09G 3/3406–3426; G09G 2320/0247; G09G 2320/064
See application file for complete search history.

(56) References Cited

U.S. PATENT DOCUMENTS

| | | | | |
|---|---|---|---|---|
| 6,160,556 | A * | 12/2000 | Kinoe | G06F 3/04845 345/419 |
| 8,184,088 | B2 * | 5/2012 | Nonaka | G09G 3/3426 345/698 |
| 10,902,799 | B2 * | 1/2021 | Song | G09G 3/3688 |
| 11,205,393 | B2 * | 12/2021 | Kang | G09G 3/2025 |
| 11,355,075 | B2 * | 6/2022 | Kang | G09G 3/342 |
| 2009/0140975 | A1 * | 6/2009 | Nonaka | G09G 3/3426 345/102 |
| 2014/0225935 | A1 | 8/2014 | Lee | |
| 2023/0069665 | A1 | 3/2023 | Chan | |

FOREIGN PATENT DOCUMENTS

TW 202304198 A 1/2023

* cited by examiner

*Primary Examiner* — Gene W Lee
(74) *Attorney, Agent, or Firm* — Winston Hsu

(57) ABSTRACT

The present invention discloses a display, including a backlight module and a timing controller. The backlight module includes a target backlight block and an adjacent backlight block, the adjacent backlight block is adjacent to the target backlight block. The timing controller is coupled to the backlight module, and is configured to generate an initial duty cycle of the target backlight block and an initial duty cycle of the adjacent backlight block according to an image frame, and generates an updated duty cycle of the target backlight block according to at least the initial duty cycle of the target backlight block, the initial duty cycle of the adjacent backlight block, a weight of the target backlight block, and a weight of the adjacent backlight block. The backlight module adjusts a brightness of the target backlight block according to the updated duty cycle.

16 Claims, 9 Drawing Sheets

DISPLAY WITH A BACKLIGHT MODULE COMPRISING A TARGET BLOCK AND AN ADJACENT BLOCK AND METHOD OF CONTROLLING THE SAME

BACKGROUND OF THE INVENTION

1. Field of the Invention

The invention relates to local dimming in display technology, and in particular, to a display that reduces screen flicker when an object moves between multiple backlight blocks and a control method thereof.

2. Description of the Prior Art

Liquid-Crystal Display (LCD) is a flat and thin display device widely used in computers, televisions and communication devices. The LCD uses a backlight module under the LCD panel to provide a light source to display the image on the LCD panel. In order to improve contrast, the LCD uses local dimming technology to divide the backlight module into multiple backlight blocks to adjust the brightness independently to meet the needs of different occasions and activities. Local dimming not only provides better lighting effects, but also saves energy, extends the service life of lighting facilities, and provides enhanced flexibility.

When an object moves on an LCD panel, it is crucial for the object's brightness to remain consistent. Otherwise, variations in brightness can lead to screen flickering. However, in existing designs, the impact of adjacent backlight areas on brightness is often overlooked. As a result, precise control over the object's brightness is challenging. When the object moves, this lack of accurate control causes fluctuations in brightness, resulting in screen flicker.

SUMMARY OF THE INVENTION

An embodiment of the present invention provides a method of controlling a display. The display includes a backlight module and a timing controller. The backlight module includes a target backlight block and an adjacent backlight block, the adjacent backlight block is adjacent to the target backlight block. The timing controller is coupled to the backlight module. The method includes the timing controller generating an initial duty cycle of the target backlight block and an initial duty cycle of the adjacent backlight block according to an image frame, the timing controller generating an updated duty cycle of the target backlight block according to at least the initial duty cycle of the target backlight block, the initial duty cycle of the adjacent backlight block, a weight of the target backlight block, and a weight of the adjacent backlight block, and the backlight module adjusting a brightness of the target backlight block according to the updated duty cycle.

An embodiment of the present invention provides a display, including a backlight module and a timing controller. The backlight module includes a target backlight block and an adjacent backlight block. The adjacent backlight block is adjacent to the target backlight block. The timing controller is coupled to the backlight module, and is configured to generate an initial duty cycle of the target backlight block and an initial duty cycle of the adjacent backlight block according to an image frame, and generates an updated duty cycle of the target backlight block according to at least the initial duty cycle of the target backlight block, the initial duty cycle of the adjacent backlight block, a weight of the target backlight block, and a weight of the adjacent backlight block. The backlight module adjusts a brightness of the target backlight block according to the updated duty cycle.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
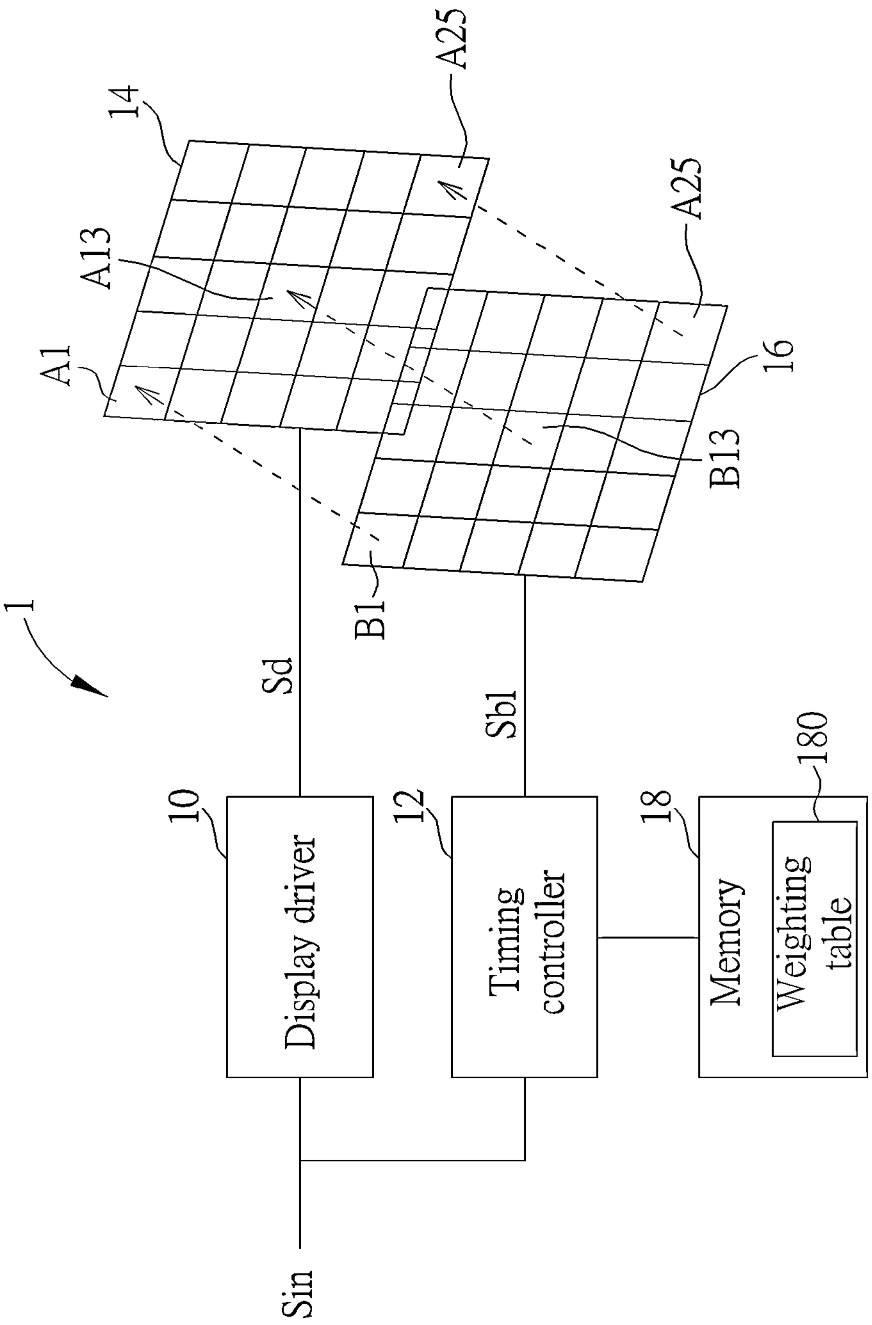
FIG. 1 is a schematic diagram of a display according to an embodiment of the present invention.

FIG. 1 is a schematic diagram of a display 1 according to an embodiment of the present invention. When an object moves on the display 1, the brightness of the object is maintained consistent and screen flicker is reduced.

The display 1 may include a display driver 10, a timing controller 12, a display panel 14, and a backlight module 16. The display driver 10 may be coupled to the timing controller 12, the timing controller 12 may be coupled to the backlight module 16, and the backlight module 16 may illuminate light to the display panel 14.

The display panel 14 may include a plurality of pixels, and the plurality of pixels are arranged as a pixel array. For example, the display panel 14 may be a liquid crystal panel, and each pixel in the pixel array may include a plurality of liquid crystals. The backlight module 16 may include a plurality of backlight units, and the plurality of backlight units are arranged as a backlight array. For example, each backlight unit in the backlight array may include a plurality of light emitting diodes (LEDs). The display driver 10 and the timing controller 12 may receive the pixel data Sin of the image frame. The display driver 10 may generate a driving signal Sd according to the pixel data Sin and drive each pixel of the display panel 14 according to the driving signal Sd to load an image. The timing controller 12 may generate a backlight signal Sbl according to the pixel data Sin and control each backlight unit of the backlight module 16 to emit light according to the backlight signal Sbl, and illuminate light to the display panel 14 to control the brightness of the image. The driving signal Sd and the backlight signal Sbl may be voltage signals.

In an embodiment, the display panel 14 may be divided into N display blocks, and the backlight module 16 may be divided into N backlight blocks. The N backlight blocks correspond to N display blocks respectively, and N is an integer greater than 1. For example, N=25, the display panel 14 may be divided into 5×5 display blocks (display blocks A1 to A25), the backlight module 16 may be divided into 5×5 backlight blocks (backlight blocks B1 to B25), and the backlight blocks B1 to B25 corresponds to the display blocks A1 to A25 respectively. In one example, the display panel 14 may include (1920×1080) pixels, and each display block may include (384×216) pixels, so each backlight block may correspond to (384×216) pixels of the display block. In another embodiment, each backlight block of the backlight module 16 may correspond to a plurality of display blocks. In this embodiment, the number of display blocks and backlight blocks is the same as an example for explanation, but it is not limited thereto. The timing controller 12 may respectively control the brightness of the backlight blocks B1 to B25 according to the backlight signal Sbl, the backlight blocks B1 to B25 may respectively illuminate light of different brightness to the display blocks A1 to A25 to realize local dimming of the display 1. The N backlight blocks may include 1 target backlight block and M adjacent backlight blocks adjacent to the target backlight block. For example, when the object is located in the display block A13, the backlight block A13 may be regarded as the target backlight block, and the backlight blocks B1 to B12 and B14 to B25 may be adjacent backlight blocks. The brightness of the target backlight block B13 may be greater than the brightness of the adjacent backlight blocks B1 to B12 and B14 to B25 to highlight the object located in the display block A13.

Figure 2:
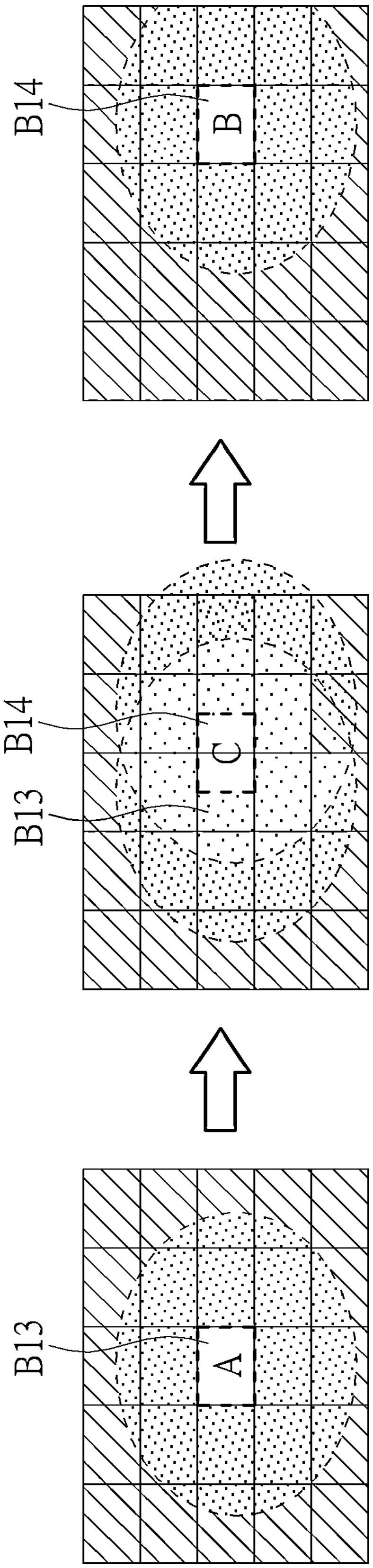
FIG. 2 is a schematic diagram of a small object moving on a display panel.
Figure 3:
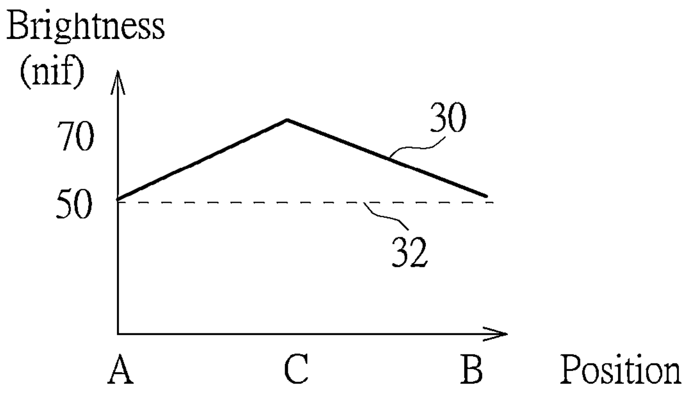
FIG. 3 is a schematic diagram of the brightness change of the small object in FIG. 2 moving on the display panel.

When an object moves on the display panel 14, the timing controller 12 may control the brightness of multiple backlight blocks to maintain the brightness of the object unchanged or only slightly change, thereby reducing screen flicker and improving user experience. FIG. 2 is a schematic diagram of an object moving on a display panel 14. The object moves from position A to position B via position C on the display panel 14. The blank area represents the brightest range and may be the position of the object, the densely dotted area represents the halo range of a single brightened backlight block, the sparsely dotted area represents the overlapping halo range of two brightened backlight blocks, and the diagonally shaded area represents the unlit range. Objects that completely fall within a single backlight block when stationary may be called small objects. In this embodiment, since the object completely falls at position A when stationary and corresponds to a single backlight block B13, the object may be called a small object. For example, the display panel 14 may be a touch panel, the object may be an application icon on the touch panel, and the user may drag the application icon from position A to position B. When the application icon is at position A, the timing controller 12 may control the backlight block B13 to turn bright and the remaining backlight blocks B1 to B12 and B14 to B25 to be dimmed. When the application icon is at position C, the timing controller 12 may control the backlight blocks B13 and B14 to turn bright and the remaining backlight blocks B1 to B12 and B15 to B25 to be dimmed. When the application icon is at position B, the timing controller 12 may control the backlight block B14 to turn bright and the remaining backlight blocks B1 to B13 and B15 to B25 to be dimmed. In the related art, all brightened backlight blocks have the same brightness. However, each brightened backlight block generates a halo, and the halo may increase the brightness of adjacent backlight blocks. When the application icon is at position A, only the backlight block B13 becomes bright (for example, the brightness is 50 nits). When the application icon is at position C, the backlight blocks B13 and B14 will become brighter at the same time, the halo of the backlight block B13 and the halo of the backlight block B14 will be superimposed on each other to enhance the brightness of the position C (for example, the brightness will be enhanced to 70 nits). And when the application icon is at position C, only the backlight block B14 becomes bright (for example, the brightness is 50 nits). Therefore, the brightness of position C is higher than the brightness of position A or position B (70>50). The brightness difference between position A and position C and the brightness difference between position C and position B will cause the screen to flicker. In this embodiment, the timing controller 12 may reduce the brightness of the backlight block when the object moves across areas, thereby maintaining the brightness of the object consistent, thereby reducing or eliminating screen flicker. FIG. 3 is a schematic diagram of the brightness change of the object in FIG. 2 moving on the display panel 14. The solid line 30 represents the brightness change of the related technology, and the dashed line 32 represents the brightness change of the embodiment of the present invention. The solid line 30 shows that the brightness of the object at position A, position C and position B in the related art is 50 nits, 70 nits and 50 nits respectively. Therefore, the brightness change of the object moving from position A to position C is 40% (=(70−50)/50), the brightness change from position C to position B is −28.5% (=(50−70)/70), causing the screen to flicker. The dashed line 32 shows that in the embodiment of the present invention, the brightness of the object at position A, position C and position B is 50 nits, 50 nits and 50 nits respectively. Therefore, the brightness change of the object moving from position A to position C and the brightness change of the object moving from position C to position B are both 0%. The brightness of the object is maintained consistent and the screen does not flicker.

In some embodiments, embodiments of the present invention may also be applied to video playback. The brightness of the backlight block is controlled according to the position of the object in the image frame, so the brightness of the object is maintained consistent and the screen does not flicker.

Referring to FIG. 1, the display 1 may further include a memory 18 storing a weighting table 180. The memory 18 may be disposed inside or outside the timing controller 12.

Figure 5:
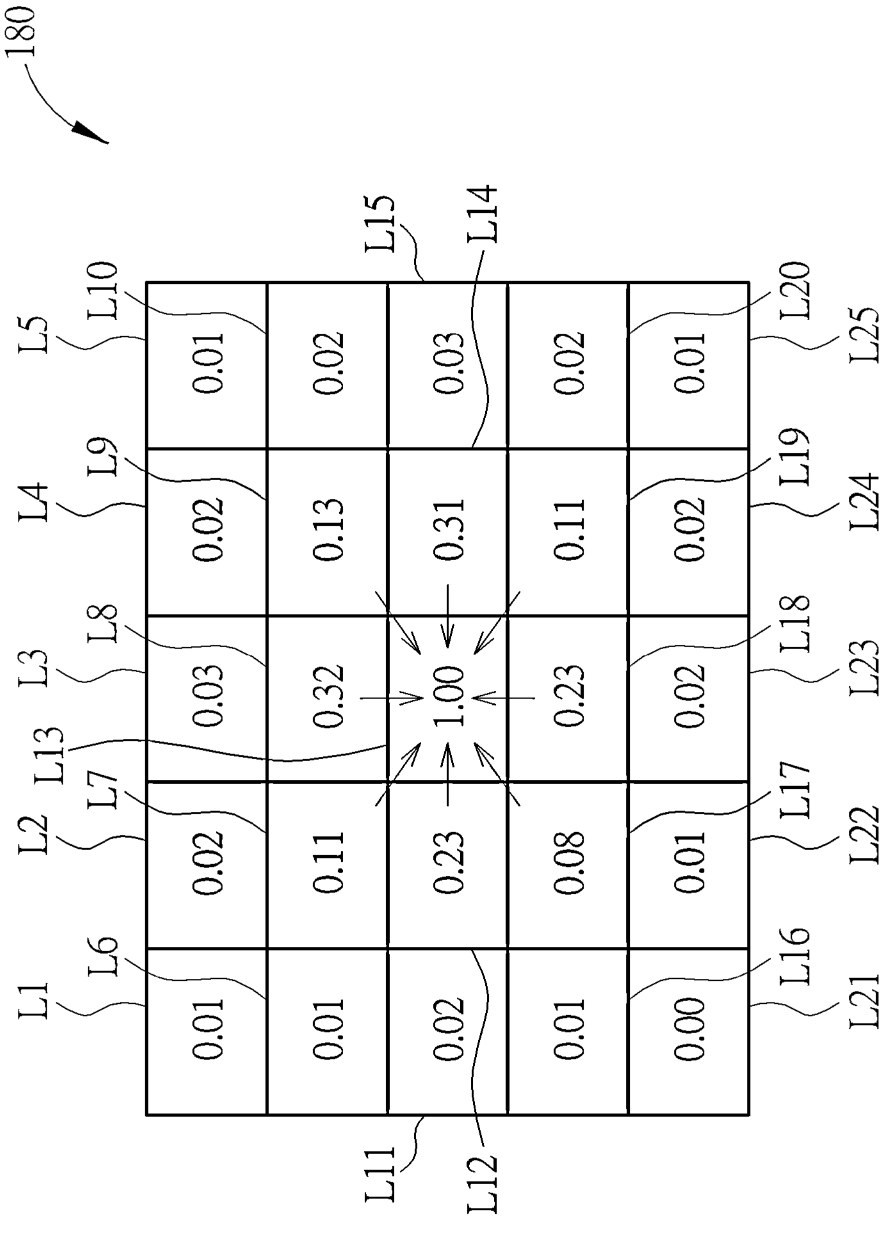
FIG. 5 is a schematic diagram of the weighting table in FIG. 1.

In this embodiment, the memory 18 is disposed outside the timing controller 12. The weighting table 180 may include a target backlight block and weights corresponding to W adjacent backlight blocks, where W is a positive integer, such as W=24, as shown in FIG. 5. The weighting table 180 can represent the weight of the impact of the light emitted by the adjacent backlight blocks on the target backlight block, so the weight of the target backlight block is set to 1. For the weight of the impact of other backlight blocks on the target backlight block, generally speaking, the target backlight block may be centered, and the corresponding weight may be generated according to the impact of the backlight blocks in a 3×3 or 5×5 range on the brightness of the target backlight block. In short, for the user, the brightness on the target backlight block is not only affected by the light emitted by the backlight block itself, but also affected by the light of adjacent backlight blocks.

FIG. 5 shows that the weighting table 180 includes 25 weights of the target backlight block located at the position L13 and 24 adjacent backlight blocks located at the positions L1 to L12 and L14 to L25. The target backlight block at position L13 has a weight of "1.00", and the weights of the adjacent backlight blocks at positions L1 to L12 and L14 to L25 are all less than 1.00.

The weight represents the weight of the impact on the target backlight block when an adjacent backlight block emits light. The larger the weight, the greater the impact on the target backlight block. For example, the weight of the adjacent backlight block at the position L12 is 0.23, and the weight of the adjacent backlight block at the position L14 is 0.31. If the brightness of the adjacent backlight block at the position L12 and the adjacent backlight block at the position L14 are the same, the impact of the adjacent backlight block at the position L14 on the target backlight block may be greater than the impact of the adjacent backlight block at the position L12 on the target backlight block. The weight distribution of the weighting table 180 may be determined by the structure and characteristics of the backlight module 16 and may be obtained through measurement and calculation. Although in this embodiment, the number of positions (W+1) in the weighting table 180 is equal to the number N of backlight blocks in the backlight module 16 (25=25), the invention is not limited thereto. In some embodiments, the number of positions (W+1) in the weighting table 180 may be less than the number N of backlight blocks in the backlight module 16, for example (W+1)=25, N=4000, the timing controller 12 may perform block dimming of 4000 backlight blocks according to the weights of the positions L1 to L25.

Figure 4:
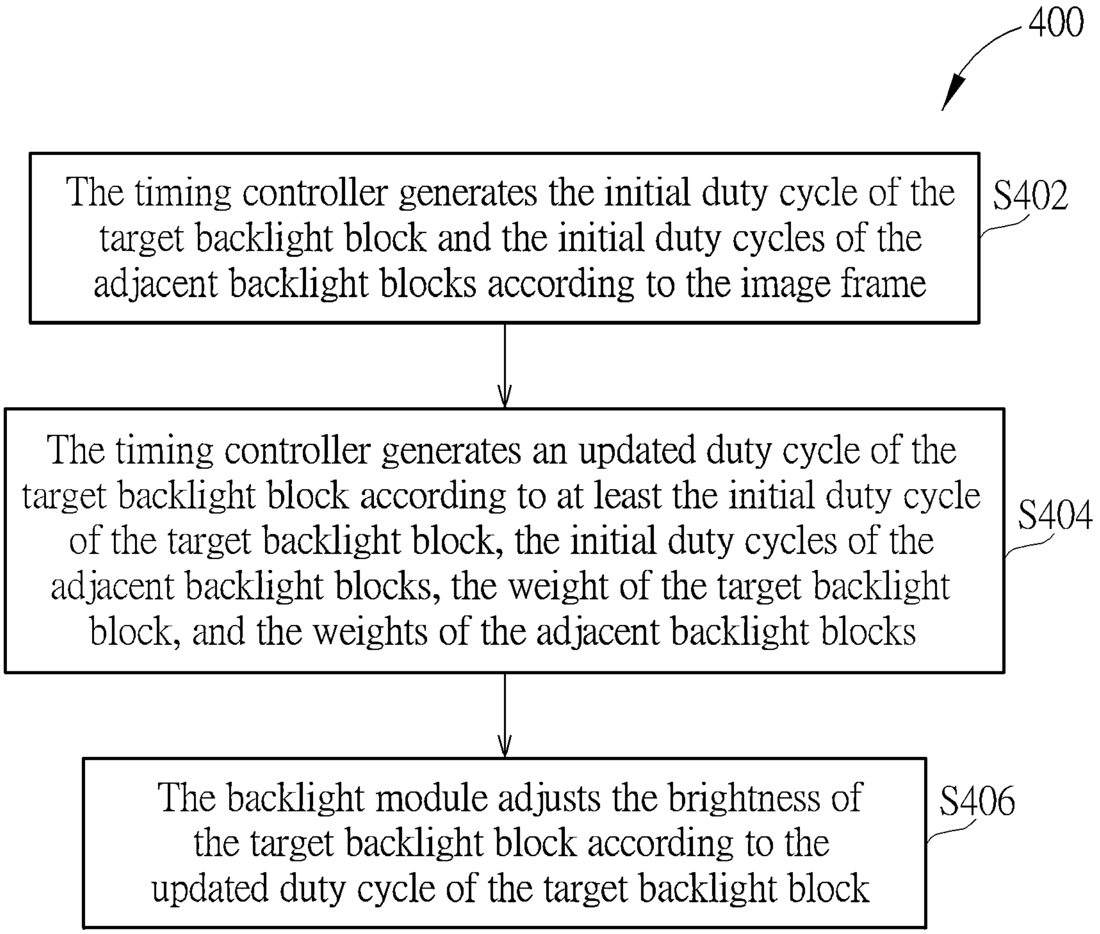
FIG. 4 is a flow chart of a control method of the display in FIG. 1.

The weighting table 180 may be used to update the duty cycle of the target backlight block (such as the backlight block B14 in FIG. 2), and then adjust the brightness of the target backlight block, as shown in the control method 400 in FIG. 4. The details of the control method 400 will be explained in subsequent paragraphs. The duty cycle of the backlight block may be positively correlated to the brightness of the backlight block. In some embodiments, the duty cycle may be normalized so that the value of the duty cycle is between 1 and 0 (inclusive). If the duty cycle of the backlight block is 1, the backlight block emits light at the maximum brightness (for example, 50 nits). If the duty cycle of the backlight block is 0, the backlight block emits light at the minimum brightness (for example, 0 nits). If the duty cycle of the backlight block is between 1 and 0, the brightness of the backlight block is between the maximum brightness and minimum brightness.

The timing controller 12 may assign an initial duty cycle to each backlight block, corresponding to the final brightness to be achieved by each backlight block. The brightness impact of adjacent backlight blocks on the target backlight block may be superimposed. For example, if the duty cycles of adjacent backlight blocks at positions L1 to L12 and L14 to L25 are both 1, then the final brightness of the target backlight block at position L13 may be 2.78 (=1+0.01+0.02+0.03+0.02+0.01+0.01+0.11+0.32+0.13+0.02+0.02+0.23+0.31+0.03+0.01+0.08+0.23+0.11+0.02+0.00+0.01+0.02+0.02+0.01). In some embodiments, when the object moves to the cross-area position (for example, position C), the timing controller 12 may acquire the weight of the target backlight block (for example, the weight of the backlight block B13 is 1.00) and the weights of the adjacent backlight blocks (for example, the weight of backlight block B14 is 0.31) from the weighting table 180 according to the position of the adjacent backlight blocks relative to the target backlight block, and adjust the duty cycle of the target backlight block according to at least the initial duty cycle of the target backlight block (for example, the initial duty cycle of the backlight block B13 is 1), the initial duty cycles of the adjacent backlight blocks (for example, the initial duty cycle of the backlight block B14 is 1), the weight of the target backlight block and the weights of the adjacent backlight blocks, so that the brightness of the cross-area position is not too bright and the brightness of the object is maintained consistent.

FIG. 4 is a flow chart of a control method 400 of the display in FIG. 1. The control method 400 includes steps S402 to S406. When an adjacent backlight block is turned on around the target backlight block, the duty cycle of the target backlight block is reduced according to at least the duty cycles and impact weights of the adjacent backlight blocks to maintain consistent brightness of the object. Any reasonable technical changes or step adjustments fall within the scope of the disclosure of the present invention. Steps S402 to S406 are as follows:

Step S402: The timing controller 12 generates the initial duty cycle of the target backlight block and the initial duty cycles of the adjacent backlight blocks according to the image frame;

Step S404: The timing controller generates an updated duty cycle of the target backlight block according to at least the initial duty cycle of the target backlight block, the initial duty cycles of the adjacent backlight blocks, the weight of the target backlight block, and the weights of the adjacent backlight blocks;

Step S406: The backlight module 16 adjusts the brightness of the target backlight block according to the updated duty cycle of the target backlight block.

In Step S402, the timing controller 12 may generate initial duty cycles of the target backlight block and adjacent backlight blocks according to the position of the selected object in the image frame. The initial duty cycles of any two of the backlight blocks B1 to B25 may be the same or different. If the selected object in the image frame occupies the target backlight block, the initial duty cycle of the target backlight block may be greater than the initial duty cycles of the backlight blocks not occupied by the selected object. Taking FIG. 2 as an example, when the object is at position A, the selected object occupies the selected backlight block B13, the initial duty cycle of the selected backlight block B13 may be 1 and the initial duty cycles of the remaining backlight blocks B1 to B12 and B14 to B25 may be 0, therefore the initial duty cycle of the selected backlight block B13 is greater than any of the initial duty cycles of the remaining backlight blocks B1 to B12 and B14 to B25. When the object is at position C, the selected object occupies the selected backlight blocks B13 and B14, the initial duty cycle of the selected backlight blocks B13 and B14 may be 1 and the initial duty cycle of the remaining backlight blocks B1 to B12 and B15 to B25 may be 0, therefore the initial duty cycles of the selected backlight blocks B13 and B14 are greater than any of the initial duty cycles of the remaining backlight blocks B1 to B12 and B15 to B25.

In Step S404, the timing controller 12 may acquire the weight of the target backlight block and the weights of the adjacent backlight blocks from the weighting table 180 according to the positions of the adjacent backlight blocks relative to the target backlight block, and generate updated coefficient for the target backlight block according to the initial duty cycles of the target backlight block, the initial duty cycles of the adjacent backlight blocks, the weight of the target backlight block, and the weights of the adjacent backlight blocks. Then the timing controller 12 generates an updated duty cycle of the target backlight block according to the initial duty cycle of the target backlight block and the updated coefficient of the target backlight block. The M weights of adjacent backlight blocks are all greater than the weight threshold. For example, the weight threshold may be 0.05. If the weight of an adjacent backlight block is greater than 0.05, the timing controller 12 may take the impact of the adjacent backlight block on the target backlight block into consideration when calculating the updated duty cycle. If the weight of an adjacent backlight block is less than or equal to 0.05, the timing controller 12 may not take the impact of the adjacent backlight block on the target backlight block into consideration in calculating the updated duty cycle. Please refer to FIG. 5, since the weights of positions L7 to L9, L12, L14, and L17 to L19 are all greater than 0.05, and the weights of positions L1 to L6, L10 to L11, L15 to L16, and L20 to L25 are all less than 0.05, the timing controller 12 may include adjacent backlight blocks at positions L7 to L9, L12, L14, and L17 to L19 and ignore adjacent backlight blocks at positions L1 to L6, L10 to L11, L15 to L16, and L20 to L25 to calculate the updated duty cycle. The updated coefficient may be a positive number less than 1, and the timing controller 12 may multiply the initial duty cycle of the target backlight block and the updated coefficient to generate an updated duty cycle.

In Step S406, the backlight module 16 generates a current signal according to the updated duty cycle of the target backlight block. The current signal is provided to the LED in the backlight unit to adjust the brightness of the target backlight block. If the updated duty cycle is increased, the current signal provided to the LED is increased, thereby increasing the brightness of the target backlight block. If the updated duty cycle is reduced, the current signal provided to the LED is reduced, thereby reducing the brightness of the target backlight block.

The aforementioned weighting table is illustrated using a 25-square grid as an example, but the actual application is not limited to this, and a nine-square grid weighting table may also be used. Since the image data affects the backlight value, when an object moves from the current backlight block to an adjacent backlight block, the image data of the object may cause the backlight value to change, making the overall brightness uneven. Even with the weighting table to reduce uneven brightness, images of image data may still be added to optimize the brightness through an updated coefficient. The updated coefficient is related to the value of the weighting table. Please refer to the following for instructions on the updated coefficient.

Figure 6B:
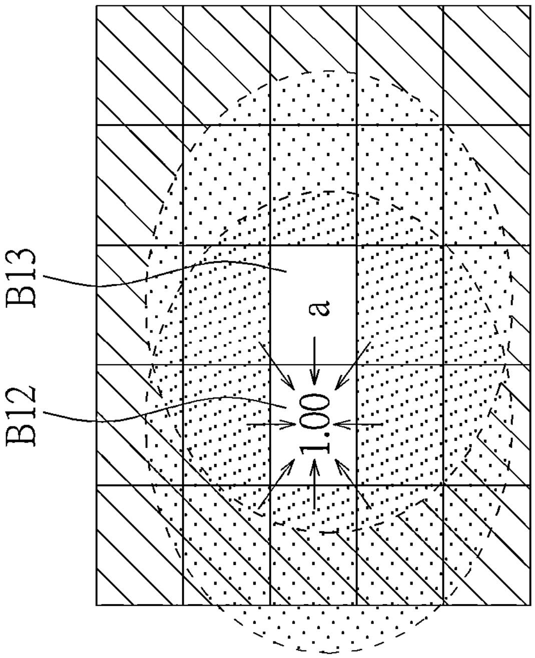
FIG. 6A and FIG. 6B are schematic diagrams of weights of the impact of two adjacent backlight blocks on target backlight blocks respectively.
Figure 6A:
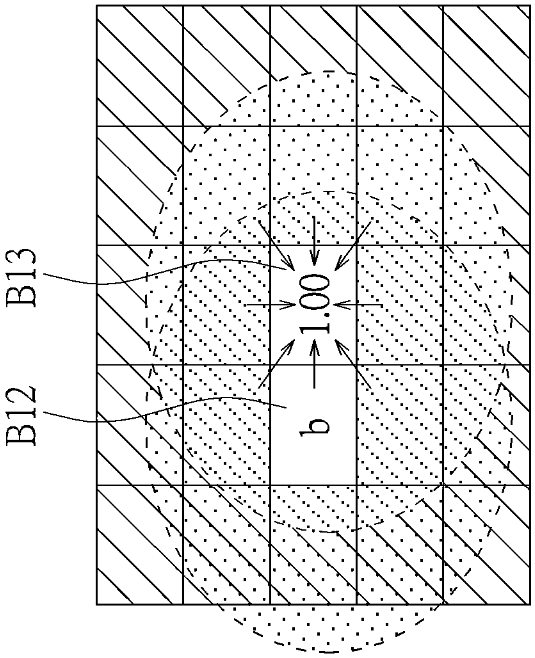

Step S404 will be described below with reference to FIG. 6A and FIG. 6B. FIG. 6A and FIG. 6B are schematic diagrams of weights of the impact of two adjacent backlight blocks on target backlight blocks respectively. The selected object may be located at the junction of backlight blocks B12 and B13, so backlight blocks B12 and B13 may be brightened and the remaining backlight blocks B1 to B11 and B14 to B25 may be dimmed. The initial duty cycle DA of the backlight block B13 and the initial duty cycle DB of the backlight block B12 may both be 1.00, and the initial duty cycles of the backlight blocks B1 to B11 and B14 to B25 may all be 0. Since the brightness of the backlight block B12 and the brightness of the backlight block B13 may affect each other's final brightness, the timing controller 12 may calculate the updated coefficient C1 of the backlight block B12 for the backlight block B12, calculate the updated coefficient C2 of the backlight block B13 for the backlight block B13, reduce the initial duty cycle DA according to the updated coefficient C1 to generate an updated duty cycle of the backlight block B12, and reduce the initial duty cycle DB according to the updated coefficient C2 to generate an updated duty cycle of the backlight block B13.

In FIG. 6A, the backlight block B13 may be regarded as a target backlight block, the backlight block B12 may be regarded as an adjacent backlight block, the target backlight block B13 may have an initial duty cycle DA, the adjacent backlight block B12 may have an initial duty cycle DB, and the brightness impact of the adjacent backlight block B12 on the target backlight block B13 may be represented by the weight b. The final brightness of the target backlight block B13 multiplied by the updated coefficient C1 may be equal to the updated brightness of the target backlight block B13. The final brightness of the adjacent backlight block B12 multiplied by the weight b and then multiplied by the updated coefficient C2 may be equal to the brightness contributed by the adjacent backlight block B12 to the target backlight block B13. The sum of the updated brightness of the target backlight block B13 and the brightness contributed by the adjacent backlight block B12 to the target backlight block B13 should be equal to the final brightness of the target backlight block B13. Since the initial duty cycle of the backlight block may be positively correlated to its final brightness, the initial duty cycle DA of the target backlight block B13 may be expressed by equation (1):

$$DA = DA * C1 + DB * b * C2 \qquad \text{equation (1)}$$

Where DA is the initial duty cycle of the target backlight block B13; DB is the initial duty cycle of the adjacent backlight block B12; C1 is the updated coefficient of the target backlight block B13; C2 is the updated coefficient of the adjacent backlight block B12; and b is the weight of the adjacent backlight block B12.

DA to DI are the initial duty cycles of the backlight blocks B13, B12, B14, B7 to B9, and B17 to B19 respectively.

In FIG. 6B, the backlight block B12 may be regarded as a target backlight block, the backlight block B13 may be regarded as an adjacent backlight block, the target backlight block B12 may have an initial duty cycle DB, the adjacent backlight block B13 may have an initial duty cycle DA, and the brightness impact of the adjacent backlight block B13 on the target backlight block B12 may be represented by the weight a.

Since the final brightness of the target backlight block B12 multiplied by the updated coefficient C2 may be equal to the updated brightness of the target backlight block B12. The final brightness of the adjacent backlight block B13 multiplied by the weight a and then multiplied by the updated coefficient C1 may be equal to the brightness contributed by the adjacent backlight block B13 to the target backlight block B12. The sum of the updated brightness of the target backlight block B12 and the brightness contributed by the adjacent backlight block B13 to the target backlight block B12 should be equal to the final brightness of the target backlight block B12. The initial duty cycle DB of the target backlight block B12 may be expressed by equation (2):

$$DB = DB * C2 + DA * a * C1 \qquad \text{equation (2)}$$

Where DB is the initial duty cycle of the target backlight block B12; DA is the initial duty cycle of the adjacent backlight block B13; C2 is the updated coefficient of the target backlight block B12; C1 is the updated coefficient of the adjacent backlight block B13; and a is the weight of the adjacent backlight block B13.

According to equation (1) and equation (2), the updated coefficient C1 and the updated coefficient C2 may be obtained by solving the simultaneous equations, and are expressed by equation (3) and equation (4) respectively:

$$C1=(DA-b*DB)/(DA-a*b*DA) \quad \text{equation (3)}$$

$$C2=(DB-a*DA)/(DB-a*b*DB) \quad \text{equation (4)}$$

The updated duty cycle DA' of the backlight block B13 and the updated duty cycle DB' of the backlight block B12 may be expressed by equation (5) and equation (6) respectively:

$$DA'=DA*C1 \quad \text{equation (5)}$$

$$DB'=DB*C2 \quad \text{equation (6)}$$

Where DA' is the updated duty cycle of the backlight block B13;

DA is the initial duty cycle of the backlight block B13;

C1 is the updated coefficient of the backlight block B13;

DB' is the updated duty cycle of the backlight block B12;

DB is the initial duty cycle of the backlight block B12;

C2 is the updated coefficient of the backlight block B12.

For example, the backlight block B12 is located at the left side of the backlight block B13, corresponding to the position L12 in FIG. 5, so the weight b of the backlight block B12 is 0.23. Similarly, the backlight block B13 is located at the right side of the backlight block B12, corresponding to the position L14 in FIG. 5, so the weight a of the backlight block B12 is 0.31. According to equation (3), the updated coefficient C1 of backlight block B12 is 0.83 (=(1−0.23*1)/(1−0.31*0.23*1)). Then according to equation (5), the updated duty cycle DA' may be 0.83 (=1*0.83), and the updated brightness of the backlight block B12 may be 0.83 times the final brightness. According to equation (4), the updated coefficient C2 of backlight block B13 is 0.74 (=(1−0.31*1)/(1−0.31*0.23*1)). Then according to equation (6), the updated duty cycle DB' may be 0.74 (=1*0.74), and the updated brightness of the backlight block B13 may be 0.74 times the final brightness. Therefore, the timing controller 12 adjusts the updated duty cycle DA' and the updated duty cycle DB' to be smaller than the initial duty cycle DA and the initial duty cycle DB respectively, so the final brightness of the backlight blocks B13 and B12 is maintained at the maximum brightness (corresponding to the initial duty cycle "1").

Figure 7:
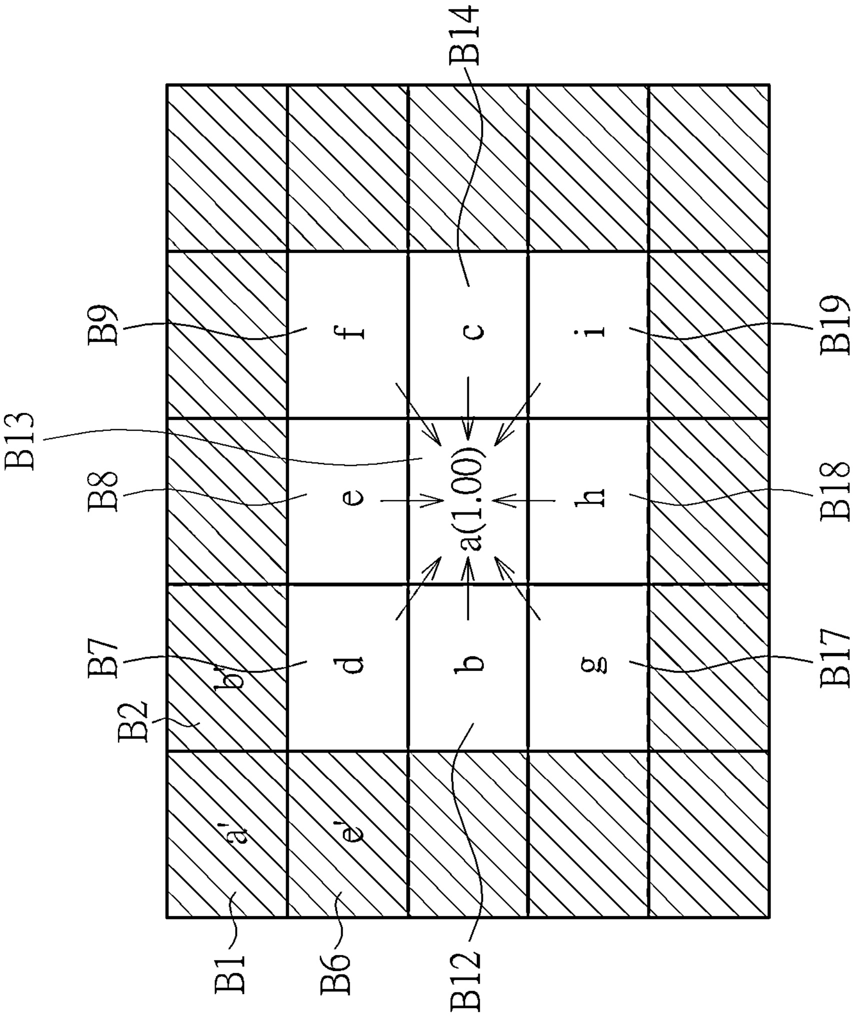
FIG. 7 is a schematic diagram of weights of the impact of another adjacent backlight block on a target backlight block.

In another example, the weight threshold may be 0.05. If the weight of an adjacent backlight block is greater than 0.05, the timing controller 12 may take the impact of the adjacent backlight block on the target backlight block into consideration when calculating the updated duty cycle. If the weight of an adjacent backlight block is less than or equal to 0.05, the timing controller 12 may not take the impact of the adjacent backlight block on the target backlight block into consideration in calculating the updated duty cycle. Please refer to FIG. 5, since the weights of positions L7 to L9, L12, L14, L17 to L19 are all greater than 0.05, and the weights of positions L1 to L6, L10, L11, L15, L16, and L20 to L25 are all less than 0.05, the timing controller 12 may take adjacent backlight blocks at positions L7 to L9, L12, L14, L17 to L19 into consideration in calculating the updated duty cycle. FIG. 7 is a schematic diagram of weights of the impact of another adjacent backlight block on a target backlight block. The selected object may be located in the backlight block B13, so the backlight block B13 may be brightened, and the remaining backlight blocks B1 to B12 and B14 to B25 may remain bright or be dimmed. According to FIG. 5, the weight a of the backlight block B13 may be 1.00, the weight b of the backlight block B12 may be 0.23, and the weight c of the backlight block B4 may be 0.31. The weight d of the backlight block B7 may be 0.11, the weight e of the backlight block B8 can be 0.32, the weight f of the backlight block B9 can be 0.13, the weight g of the backlight block B17 can be 0.08, the weight h of the backlight block B18 may be 0.23, the weight i of the backlight block B19 may be 0.11, and the weights of the remaining backlight blocks B1 to B6, B10, B11, B15, B16, B20 to B25 are less than 0.05. The timing controller 12 may take the backlight blocks B12, B14, B7 to B9, and B17 to B19 into consideration in calculating the updated duty cycle of the target backlight block B13.

Figure 8:
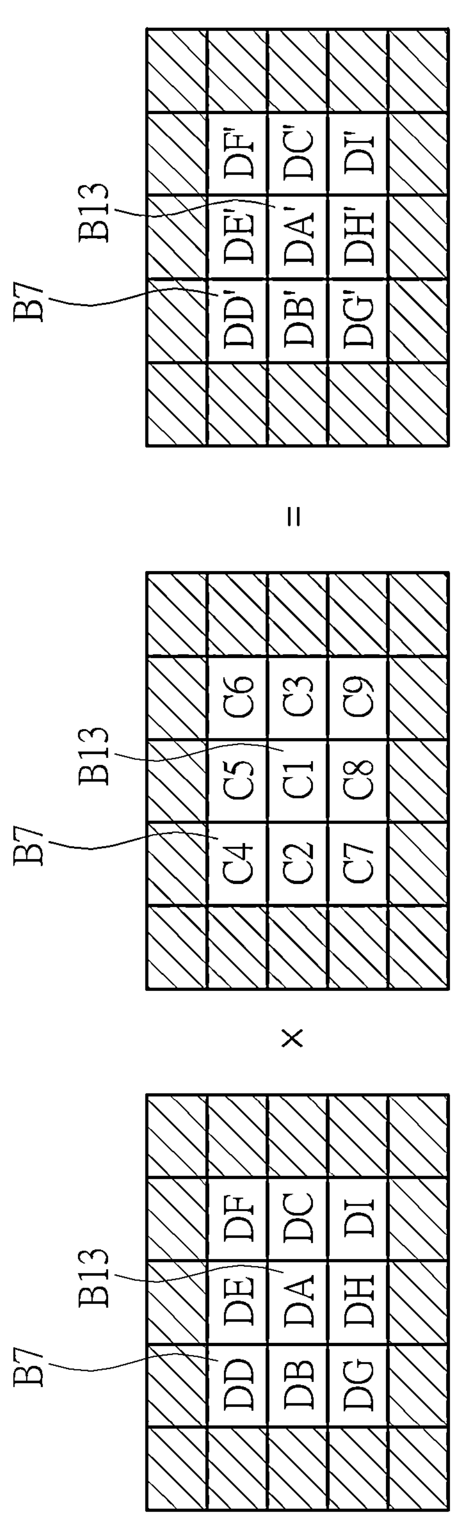
FIG. 8 is a schematic diagram of step S404 in FIG. 4.

FIG. 8 is a schematic diagram of step S404. The initial duty cycle DA of the backlight block B13 may be 1, and the initial duty cycles DB to DI of the backlight blocks B12, B14, B7 to B9, and B17 to B19 may all be 0.5. The timing controller 12 may calculate the updated coefficients C1 to C9 of the backlight blocks B13, B12, B14, B7 to B9, and B17 to B19 respectively. When calculating the updated coefficient C1 of the backlight block B13, the backlight block B13 may be regarded as the target backlight block, and the backlight blocks B12, B14, B7 to B9, and B17 to B19 may be regarded as adjacent backlight blocks. The timing controller 12 may generate the updated coefficient C1 of the target backlight block 13 according to the initial duty cycle DA of the target backlight block B13, the initial duty cycles DB to DI of adjacent backlight blocks B12, B14, B7 to B9 and B17 to B19, the weight a of the target backlight block B13, and the weights b to i of adjacent backlight blocks B7 to B9, B12, B14, B17 to B19, as shown in equation (7):

$$C1=(a*DA-b*DB-c*DC-d*DD-e*DE-f*DF-g*DG-h*DH-i*DI/(a*a*DA-b*c*DA-b*c*DA-e*h*DA-e*h*DA-f*g*DA-f*g*DA-d*i*DA-d*i*DA) \quad \text{equation (7)}$$

Where C1 is the updated coefficient of the target backlight block B13;

a to i are the weights of the backlight blocks B13, B12, B14, B7 to B9, and B17 to B19 respectively; and DA to DI are the initial duty cycles of the backlight blocks B13, B12, B14, B7 to B9, and B17 to B19 respectively.

Please refer to equation (7), a*DA is the numerator term corresponding to the target backlight block B13, a*a*DA is the denominator term corresponding to the target backlight block B13. b*DB is the numerator term corresponding to the adjacent backlight block B12, b*c*DA is the denominator term corresponding to the adjacent backlight block B12. c*DC is the numerator term corresponding to the adjacent backlight block B14, and b*c*DA is the denominator term corresponding to the adjacent backlight block B14. d*DD is the numerator term corresponding to the adjacent backlight block B7, and d*i*DA is the denominator term corresponding to the adjacent backlight block B7. i*DI is the numerator term corresponding to the adjacent backlight block B19, and d*i*DA is the denominator term corresponding to the adjacent backlight block B19. e*DE is the numerator term corresponding to the adjacent backlight block B8, and e*h*DA is the denominator term corresponding to the adjacent backlight block B8. h*DH is the numerator term corresponding to the adjacent backlight block B18, and e*h*DA is the denominator term corresponding to the adjacent backlight block B18. f*DF is the numerator term corresponding to the adjacent backlight block B9, f*g*DA is the denominator term corresponding to the adjacent backlight block B9. g*DG is the numerator term corresponding to the adjacent backlight block B17, and f*g*DA is the denominator term corresponding to the adjacent backlight block B17. According to equation (7), the updated coefficient C1 of the target backlight block B13 may be 0.36 (=(1*1–0.23*0.5–0.31*0.5–0.11*0.5–0.32*0.5–0.13*0.5–0.08*0.5–0.23*0.5–0.11*0.5)/(1*1*1–0.23*0.31*1–0.23*0.31*1–0.32*0.23*1–0.32*0.23*1–0.13*0.08*1–0.13*0.08*1–0.11*0.11*1–0.11*0.11*1)).

If any of the initial duty cycles DB to DI is 0 (that is, the corresponding backlight block emits light at the minimum brightness), the corresponding item of equation (7) would not be used to calculate the updated coefficient C1. For example, if the initial duty cycle DB is 0, the numerator term b*DB and the denominator term b*c*DA corresponding to the backlight block B12 would be removed from equation (7) to calculate the updated coefficient C1 of the target backlight block B13, as shown in equation (8):

$$C1 = (a*DA - c*DC - d*DD - e*DE - f*DF - g*DG - h*DH - i*DI) / (a*a*DA - b*c*DA - e*h*DA - e*h*DA - f*g*DA - f*g*DA - d*i*DA - d*i*DA) \quad \text{equation (8)}$$

According to equation (8), the updated coefficient C1 of the target backlight block B13 may be 0.48 (=(1*1–0.31*0.5–0.11*0.5–0.32*0.5–0.13*0.5–0.08*0.5–0.23*0.5–0.11*0.5)/(1*1*1–0.23*0.31*1–0.32*0.23*1–0.32*0.23*1–0.13*0.08*1–0.13*0.08*1–0.11*0.11*1–0.11*0.11*1)), and is greater than the updated coefficient C1 of the initial duty cycle DB of 0.5. Since the overall brightness of the adjacent backlight blocks B12, B14, B7 to B9, and B17 to B19 of the target backlight block B13 decreases, the updated coefficient C1 of the target backlight block B13 would increase to maintain consistent brightness of the object.

When calculating the updated coefficient C4 of the backlight block B7, the backlight block B7 may be regarded as the target backlight block, and the backlight blocks B13, B12 and B8 may be regarded as adjacent backlight blocks. The timing controller 12 may generate the updated coefficient C4 of the target backlight block B7 according to the initial duty cycle DD of the target backlight block B7, the initial duty cycles DA, DB and DE of the adjacent backlight blocks B13, B12 and B8, the weight d of the target backlight block B7, and the weights a, b and e of the adjacent backlight blocks B13, B12 and B8, as shown in equation (9):

$$C4 = (d*DD - a*DA - b*DB - e*DE) / (d*d*DD - e*e'*DD - a*a'*DD - b*b'*DD) \quad \text{equation (9)}$$

Wherein C4 is the updated coefficient of the target backlight block B13;

a, b, d, e, a', b', e' are the weights of backlight blocks B13, B12, B7, B8, B1, B2 and B6 respectively; and DA, DB, DD, and DE are the initial duty cycles of the backlight blocks B13, B12, B7, and B8 respectively.

Please refer to FIG. 5 and FIG. 7. For the target backlight block B7, d corresponds to the weight "1.00" of the position L13, a corresponds to the weight "0.11" of the position L19, b corresponds to the weight "0.23" of the position L18, e corresponds to the weight "0.31" of the position L14, a' corresponds to the weight "0.11" of the position L7, b' corresponds to the weight "0.23" of the position L12, and e' corresponds to the weight "0.32" of the position L8. Therefore, according to equation (9), the updated coefficient C4 of the backlight block B7 may be 0.28 (=(1*0.5–0.11*1–0.23*0.5–0.31*0.5)/(1*1*0.5–0.31*0.23*0.5–0.32*0.23*0.5–0.11*0.11*0.5)). The equations of the updated coefficients C2, C3, C5 to C9 of the remaining backlight blocks B12, B14, B8, B9, and B17 to B19 may also be derived according to similar principles, and will not be repeated here for the sake of brevity.

The respective updated duty cycles DA' to DI' of the backlight blocks B13, B12, B14, B7 to B9 and B17 to B19 may be expressed by equation (10) to equation (18) respectively:

$$DA' = DA*C1 \quad \text{equation (10)}$$

$$DB' = DB*C2 \quad \text{equation (11)}$$

$$DC' = DC*C3 \quad \text{equation (12)}$$

$$DD' = DD*C4 \quad \text{equation (13)}$$

$$DE' = DE*C5 \quad \text{equation (14)}$$

$$DF' = DF*C6 \quad \text{equation (15)}$$

$$DG' = DG*C7 \quad \text{equation (16)}$$

$$DH' = DH*C8 \quad \text{equation (17)}$$

$$DI' = DI*C9 \quad \text{equation (18)}$$

According to equation (10), if the initial duty cycle DA is 1 and the updated coefficient C1 is 0.36, the updated duty cycle DA' is 0.36. According to equation (13), if the initial duty cycle DD is 0.5 and the updated coefficient C4 is 0.28, the updated duty cycle DD' is 0.14. Therefore, the timing controller 12 would adjust the updated duty cycle DA' and the updated duty cycle DD' to be smaller than the initial duty cycle DA and the initial duty cycle DD respectively, so that the final brightness of the backlight block B13 is maintained at the maximum brightness (corresponding to the initial duty cycle DA "1") and the final brightness of the backlight block B7 is maintained at half brightness (corresponding to the initial duty cycle DD "0.5").

Table 1 shows the final brightness (in nits) of the backlight block B13 measured directly according to the initial duty cycle of the backlight block in the related art, as shown in FIG. 2 when the object is at position A. The horizontal axis of Table 1 represents the duty cycle of the backlight block B13, and the vertical axis represents the duty cycle of the backlight block B12. As the duty cycle of the backlight block B12 increases, the brightness of the backlight block B13 also increases significantly. For example, when the duty cycle of backlight block B13 is 1, as the duty cycle of backlight block B12 increases from 0 to 1, the brightness of backlight block B13 also increases from 162 nits to 199 nits, the increase is 37 nits (23%).

TABLE 1

| B12\B13 | 1 | 0.875 | 0.75 | 0.675 | 0.5 | 0.325 | 0.25 | 0.125 | 0 |
|---|---|---|---|---|---|---|---|---|---|
| 0 | 162 | 143 | 122 | 104 | 83 | 62 | 42 | 21 | 0 |
| 0.125 | 167 | 148 | 127 | 108 | 88 | 67 | 47 | 26 | 5 |
| 0.25 | 172 | 153 | 132 | 113 | 93 | 72 | 52 | 31 | 10 |
| 0.325 | 176 | 158 | 137 | 118 | 98 | 77 | 57 | 36 | 15 |
| 0.5 | 181 | 162 | 142 | 123 | 102 | 82 | 62 | 41 | 19 |
| 0.675 | 186 | 167 | 146 | 127 | 107 | 86 | 66 | 45 | 24 |
| 0.75 | 190 | 171 | 151 | 132 | 111 | 91 | 71 | 50 | 28 |
| 0.875 | 195 | 176 | 155 | 136 | 116 | 95 | 75 | 54 | 33 |
| 1 | 199 | 180 | 159 | 141 | 120 | 99 | 79 | 56 | 37 |

Table 2 shows the final brightness (in nits) of the backlight block B13 measured according to the updated duty cycle of the backlight block B13 in the embodiment of the present invention, as shown in FIG. 2 when the object is at position A. The horizontal axis of Table 2 represents the duty cycle of the backlight block B13, and the vertical axis represents the duty cycle of the backlight block B12. As the duty cycle of the backlight block B12 increases, the brightness of the backlight block B13 remains unchanged or only increases slightly. For example, when the duty cycle of backlight block B13 is 1, as the duty cycle of backlight block B12 increases from 0 to 1, the brightness of backlight block B13 increases from 161 nits to 165 nits, the increase is only 4 nits (2%). Compared with related technologies, the embodiment of the present invention keeps the brightness of the backlight block B13 substantially unchanged when the adjacent backlight block B12 is fully lit, thereby reducing screen flicker and improving user experience.

TABLE 2

| B12\B13 | 1 | 0.875 | 0.75 | 0.675 | 0.5 | 0.325 | 0.25 | 0.125 | 0 |
|---|---|---|---|---|---|---|---|---|---|
| 0 | 161 | 142 | 122 | 101 | 81 | 61 | 41 | 20 | 0 |
| 0.125 | 161 | 142 | 122 | 101 | 81 | 62 | 41 | 21 | 5 |
| 0.25 | 162 | 144 | 124 | 103 | 83 | 62 | 41 | 21 | 9 |
| 0.325 | 165 | 145 | 124 | 103 | 83 | 62 | 41 | 21 | 14 |
| 0.5 | 165 | 145 | 124 | 103 | 83 | 62 | 41 | 20 | 19 |
| 0.675 | 165 | 145 | 124 | 103 | 83 | 62 | 41 | 23 | 23 |
| 0.75 | 165 | 145 | 124 | 103 | 83 | 62 | 41 | 28 | 28 |
| 0.875 | 165 | 145 | 124 | 103 | 83 | 62 | 41 | 33 | 33 |
| 1 | 165 | 145 | 124 | 103 | 83 | 62 | 41 | 37 | 37 |

Figure 9:
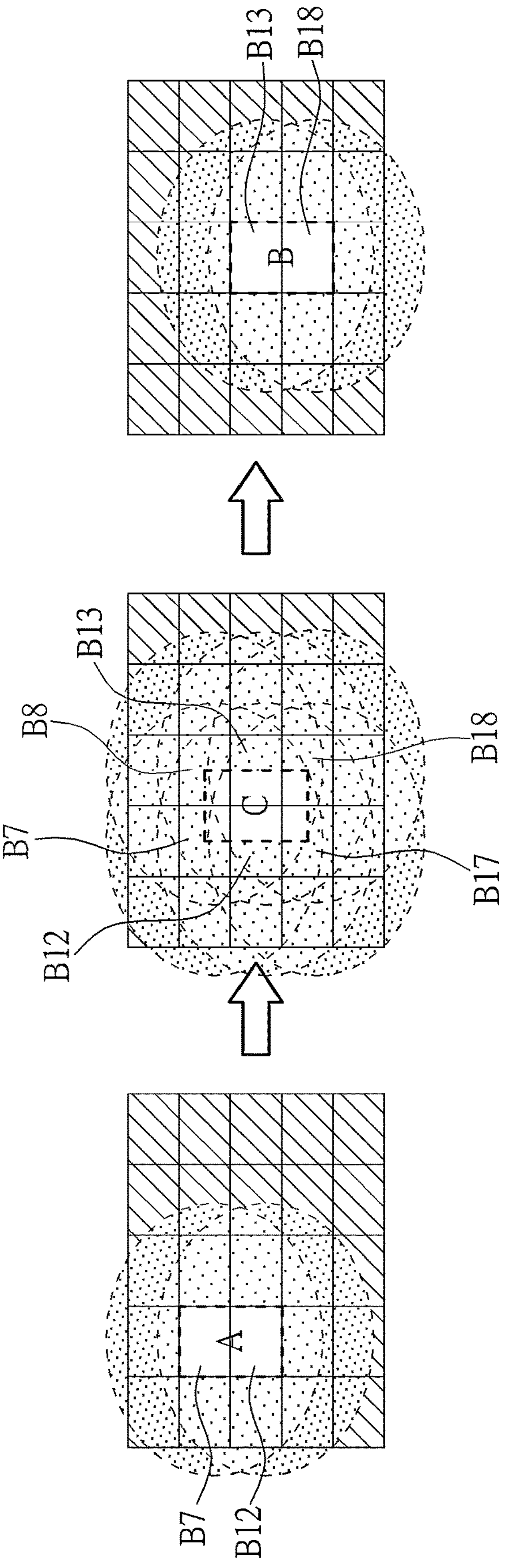
FIG. 9 is a schematic diagram of a large object moving on a display panel.

FIG. 9 is a schematic diagram of a large object moving on a display panel. The object moves from position A to position B via position C on the display panel 14. The blank area represents the brightest range and may be the position of the object, the densely dotted area represents the halo range of a single brightened backlight block, the sparsely dotted area represents the overlapping halo range e of multiple brightened backlight blocks, and the diagonally shaded area represents the unlit range. Objects that fall on multiple backlight blocks when stationary may be called large objects. In this embodiment, since the object falls at position A when stationary, corresponding to the backlight blocks B7 and B12, the object may be called a large object. When the object is at position A, the timing controller 12 may control the backlight blocks B7 and B12 to become brighter and the remaining backlight blocks to be dimmed. When an application icon is at position C, the timing controller 12 may control the backlight blocks B7 and B8, B12 and B13, and B17 and B18 to be brightened and the remaining backlight blocks to be dimmed. When the application icon is at position B, the timing controller 12 may control the backlight blocks B13 and B18 to become brighter and the remaining backlight blocks to be dimmed. The embodiment of FIG. 9 may also use the control method 400 to lower the duty cycle of the target backlight block to maintain consistent brightness of the object. However, since the timing controller 12 uses the backlight block as a unit to update the initial duty cycle of the backlight block sequentially from top to bottom and from left to right in a raster order, when the updated duty cycle of the target backlight block is generated, at least one of the M initial duty cycles of the M adjacent backlight blocks may not have been updated, causing the final brightness of the target backlight block to be too low. Since a large object occupies multiple backlight blocks, uneven brightness of the object may be particularly noticeable. For example, when the object is at position C, since the initial duty cycles of adjacent backlight blocks B17 and B18 have not been updated when calculating the updated duty cycle of backlight block B13, the final brightness of backlight block B13 may be incorrect (lower than the target brightness). However, when calculating the updated duty cycle of backlight block B18, the initial duty cycles of adjacent backlight blocks B12, B13 and B17 have been updated, so the final brightness of backlight block B18 may be more accurate (equal to the target brightness), causing the final brightness of the backlight blocks B13 and B18 to be unequal. Therefore, for large objects, the timing controller 12 may further reduce the updated coefficient to reduce uneven brightness of the object. In step S404, the timing controller 12 may acquire the weight of the target backlight block and the weights of the adjacent backlight blocks from the weighting table 180 according to the positions of the adjacent backlight blocks relative to the target backlight block, generate the first updated coefficient of the target backlight block according to the initial duty cycle of the target backlight block, the initial duty cycles of the adjacent backlight blocks, the weight of the target backlight block, and the weights of the adjacent backlight blocks, and generate a second updated coefficient according to the reduction coefficient and the first updated coefficient. Then, an updated duty cycle of the target backlight block is generated according to the initial duty cycle of the target backlight block and the second updated coefficient of the target backlight block, and the second updated coefficient is smaller than the first updated coefficient. The reduction coefficient is a positive number less than 1. The timing controller 12 may multiply the reduction coefficient and the first updated coefficient to generate a second updated coefficient. For example, if the reduction coefficient is 0.5, the initial duty cycles of backlight blocks B13 and B18 are both 1, the first updated coefficient of backlight block B13 is 0.6, and the first updated coefficient of backlight block B18 is 0.8, then the second updated coefficient of the backlight block B13 is 0.3 (=0.6*0.5), and the second updated coefficient of the backlight block B18 is 0.4 (=0.8*0.5). Before the reduction coefficient is used, the difference between the updated duty cycle (0.6) of the backlight block B13 and the updated duty cycle (0.8) of the backlight block B18 is 0.2. After using the reduction coefficient, the difference between the updated duty cycle (0.3) of the backlight block B13 and the updated duty cycle (0.4) of the backlight block B18 is 0.1, and is smaller than the difference before the reduction coefficient is not used (0.1<0.2) to reduce uneven brightness of the object.

Figure 10:
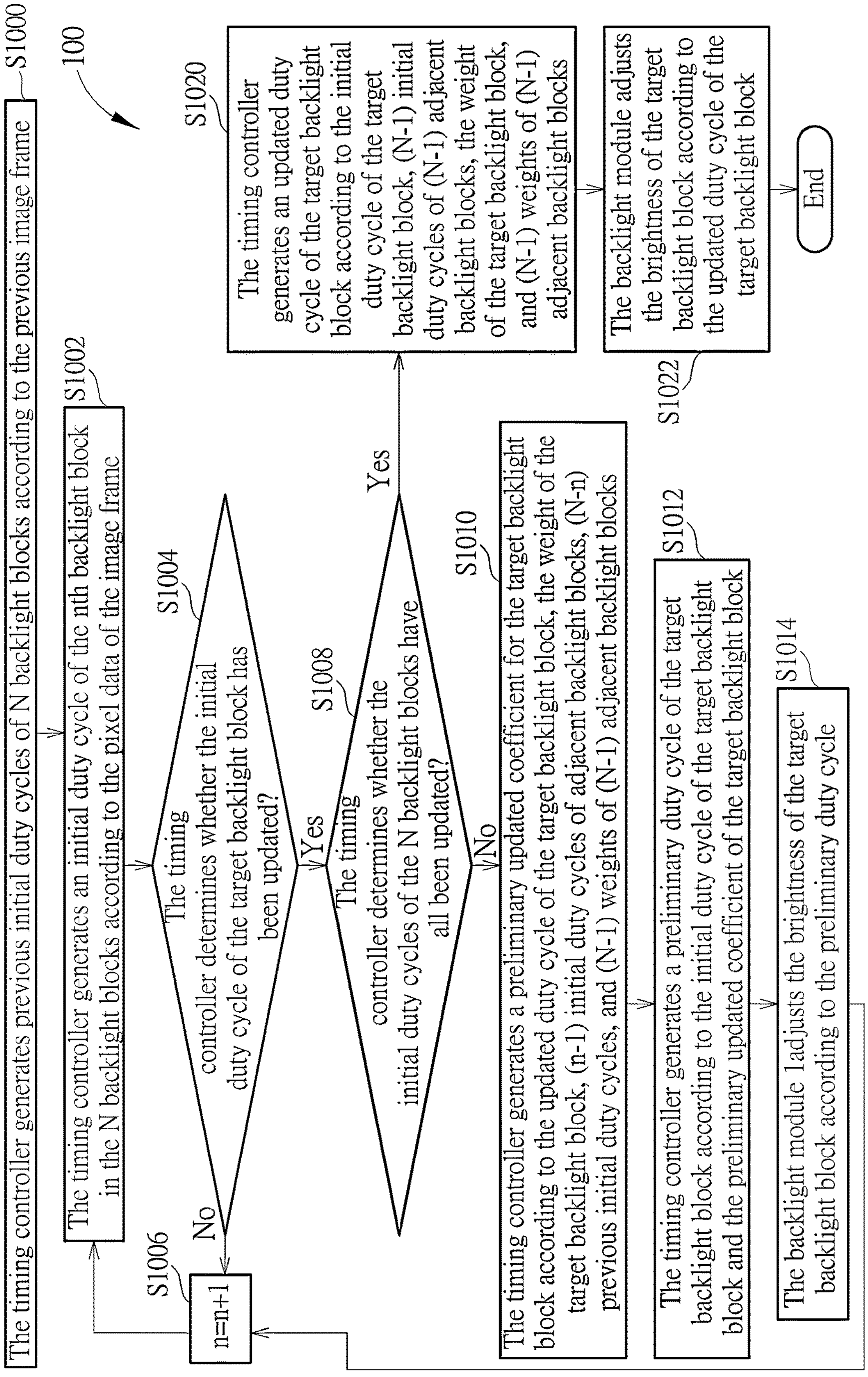
FIG. 10 is a flow chart of another control method of the display in FIG. 1.

According to the previous paragraph, the timing controller 12 may update the initial duty cycles of the backlight blocks in raster order in units of the backlight blocks. Therefore, even if the object is a small object, the final brightness of the target backlight block may be incorrect (for example, lower than the target brightness) due to the incomplete update of the M initial duty cycles of the M adjacent backlight blocks. Therefore, the display 1 may use an iteration method to recalculate the updated duty cycle of the target backlight block after the initial duty cycles of the adjacent backlight blocks are updated, as shown in the control method 100 of FIG. 10. FIG. 10 is a flow chart of another control method 100 of the display in FIG. 1. The control method 100 includes steps S1000 to S1022, using an iterative method to adjust the duty cycle of the target backlight block to maintain consistent brightness of the object. Any reasonable technical changes or step adjustments fall within the scope of the disclosure of the present invention. Steps S1000 to S1022 are as follows:

Step S1000: The timing controller 12 generates previous initial duty cycles of N backlight blocks according to the previous image frame;

Step S1002: The timing controller 12 generates an initial duty cycle of the nth backlight block in the N backlight blocks according to the pixel data of the image frame;

Step S1004: The timing controller 12 determines whether the initial duty cycle of the target backlight block has been updated? If yes, continue to step S1008; if not, continue to step S1006;

Step S1006: n=n+1; continue to step S1002;

Step S1008: The timing controller 12 determines whether the initial duty cycles of the N backlight blocks have all been updated? If yes, continue to step S1020; if not, continue to step S1010;

Step S1010: The timing controller 12 generates a preliminary updated coefficient for the target backlight block according to the updated duty cycle of the target backlight block, the weight of the target backlight block, (n−1) initial duty cycles of adjacent backlight blocks, (N−n) previous initial duty cycles, and (N−1) weights of (N−1) adjacent backlight blocks;

Step S1012: The timing controller 12 generates a preliminary duty cycle of the target backlight block according to the initial duty cycle of the target backlight block and the preliminary updated coefficient of the target backlight block;

Step S1014: The backlight module 16 adjusts the brightness of the target backlight block according to the preliminary duty cycle; continue to step S1006;

Step S1020: The timing controller 12 generates an updated duty cycle of the target backlight block according to the initial duty cycle of the target backlight block, (N−1) initial duty cycles of (N−1) adjacent backlight blocks, the weight of the target backlight block, and (N−1) weights of (N−1) adjacent backlight blocks;

Step S1022: The backlight module 16 adjusts the brightness of the target backlight block according to the updated duty cycle of the target backlight block; the control method 100 ends.

The timing controller 12 generates N previous initial duty cycles of N backlight blocks in advance according to the previous image frame (step S1000). Then, for the current image frame, the control method 100 may start with n=1 and increment n, thereby using the backlight block as a unit in raster order to sequentially generate the initial duty cycle of the nth backlight block until n=N (step S1002). The timing controller 12 executes the loop formed by steps S1002, S1004, and S1006 until the initial duty cycle of the target backlight block has been updated. Then, the timing controller 12 determines whether the N initial duty cycles of the N adjacent backlight blocks have all been updated (step S1008), if all N initial duty cycles have been updated, steps S1020 and S1022 are performed to achieve the final brightness of the target backlight block. Steps S1020 and S1022 are respectively similar to steps S404 and S406 in FIG. 4 and their description will not be repeated here. If the N initial duty cycles have not been completely updated, the loop of steps S1010, S1012, S1014 and S1006 is executed. Specifically, since only the initial duty cycle of the nth backlight block is updated and the initial duty cycles of the (n+1)th backlight block to the Nth backlight block have not been updated, the timing controller 12 can only generate the preliminary updated coefficient of the target backlight block according to the initial duty cycle of the nth backlight block and the previous initial duty cycles of the (n+1)th backlight block to the Nth backlight block (step S1010), and generate a preliminary duty cycle of the target backlight block according to the initial duty cycle of the target backlight block and the preliminary updated coefficient of the target backlight block (step S1012), then adjust the brightness of the target backlight block according to the preliminary duty cycle (step S1014). The loop of steps S1010, S1012, S1014 and S1006 is repeated to gradually update the updated duty cycle of the target backlight block in an iterative manner, so as to gradually approach the final brightness of the target backlight block.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling a display, the display comprising a backlight module and a timing controller, the backlight module comprising a target backlight block and an adjacent backlight block, the adjacent backlight block being adjacent to the target backlight block, the timing controller being coupled to the backlight module, the method comprising:

the timing controller generating an initial duty cycle of the target backlight block and an initial duty cycle of the adjacent backlight block according to an image frame;

the timing controller generating an updated coefficient of the target backlight block according to at least the initial duty cycle of the target backlight block, the initial duty cycle of the adjacent backlight block, the weight of the target backlight block, and the weight of the adjacent backlight block;

the timing controller generating an updated duty cycle of the target backlight block according to the initial duty cycle of the target backlight block and the updated coefficient of the target backlight block; and the backlight module adjusting a brightness of the target backlight block according to the updated duty cycle.

2. The method of claim 1, wherein:

if a selected object in the image frame occupies the target backlight block, the initial duty cycle of the target backlight block is greater than an initial duty cycle of a first backlight block not occupied by the selected object.

3. The method of claim 1, wherein:

$$\text{the updated coefficient}=(DA-b*DB)/(DA-a*b*DA);$$

wherein DA is the initial duty cycle of the target backlight block;

DB is the initial duty cycle of the adjacent backlight block;

a is the weight of the target backlight block; and b is the weight of the adjacent backlight block.

4. The method of claim 1, wherein the timing controller generating the updated coefficient of the target backlight block according to at least the initial duty cycle of the target backlight block, the initial duty cycle of the adjacent backlight block, the weight of the target backlight block, and the weight of the adjacent backlight block comprises:

the timing controller generating an updated coefficient of the target backlight block according to a reduction coefficient, the initial duty cycle of the target backlight block, the initial duty cycle of the adjacent backlight block, the weight of the target backlight block, and the weight of the adjacent backlight block.

5. The method of claim 1, wherein the weight of the adjacent backlight block is greater than a predetermined value.

6. The method of claim 1, wherein:

the backlight module further comprises another adjacent target backlight block, the another adjacent target backlight block being adjacent to the target backlight block; and the method further comprises:

the timing controller generating a previous initial duty cycle of the another adjacent backlight block according to a previous image frame;

the timing controller generating a preliminary coefficient of the target backlight block according to the updated duty cycle of the target backlight block, the initial duty cycle of the adjacent backlight block, the previous initial duty cycle of the another adjacent backlight block, the weight of the target backlight block, the weight of the adjacent backlight block, and a weight of the another adjacent backlight block;

the timing controller multiplying the initial duty cycle of the target backlight block and the preliminary coefficient of the target backlight block to generate a preliminary duty cycle; and the backlight module adjusting the brightness of the target backlight block according to the preliminary duty cycle.

7. The method of claim 6, further comprising:

the timing controller generating an initial duty cycle of the another adjacent backlight block according to the image frame;

wherein the timing controller generating the updated duty cycle of the target backlight block according to at least the initial duty cycle of the target backlight block, the initial duty cycle of the adjacent backlight block, the weight of the target backlight block, and the weight of the adjacent backlight block comprises:

the timing controller generating the updated duty cycle of the target backlight block according to the initial duty cycle of the target backlight block, the initial duty cycle of the adjacent backlight block, the initial duty cycle of the another adjacent backlight block, the weight of the target backlight block, the weight of the adjacent backlight block, and the weight of the another adjacent backlight block.

8. The method of claim 1, wherein:

the display further comprises a memory for storing a weighting table; and the method further comprises:

the timing controller acquiring the weight of the adjacent backlight block from the weighting table according to a position of the adjacent backlight block relative to the target backlight block.

9. A display comprising:

a backlight module comprising a target backlight block and an adjacent backlight block, the adjacent backlight block being adjacent to the target backlight block; and a timing controller, coupled to the backlight module, and configured to generate an initial duty cycle of the target backlight block and an initial duty cycle of the adjacent backlight block according to an image frame, generate an updated coefficient of the target backlight block according to at least the initial duty cycle of the target backlight block, the initial duty cycle of the adjacent backlight block, a weight of the target backlight block, and a weight of the adjacent backlight block, and generate an updated duty cycle of the target backlight block according to the initial duty cycle of the target backlight block and the updated coefficient of the target backlight block;

wherein the backlight module adjusts a brightness of the target backlight block according to the updated duty cycle.

10. The display of claim 9, wherein:

if a selected object in the image frame occupies the target backlight block, the initial duty cycle of the target backlight block is greater than an initial duty cycle of a first backlight block not occupied by the selected object.

11. The display of claim 9, wherein:

$$\text{the updated coefficient}=(DA-b*DB)/(DA-a*b*DA);$$

wherein DA is the initial duty cycle of the target backlight block;

DB is the initial duty cycle of the adjacent backlight block;

a is the weight of the target backlight block; and b is the weight of the adjacent backlight block.

12. The display of claim 9, wherein the timing controller generates the updated coefficient of the target backlight block according to a reduction coefficient, the initial duty cycle of the target backlight block, the initial duty cycle of the adjacent backlight block, the weight of the target backlight block, and the weight of the adjacent backlight block.

13. The display of claim 9, wherein the weight of the adjacent backlight block is greater than a predetermined value.

14. The display of claim 9, wherein:

the backlight module further comprises another adjacent target backlight block, and the another adjacent target backlight block is adjacent to the target backlight block;

the timing controller further generates a previous initial duty cycle of the another adjacent backlight block according to a previous image frame;

the timing controller further generates a preliminary coefficient of the target backlight block according to the updated duty cycle of the target backlight block, the initial duty cycle of the adjacent backlight block, the previous initial duty cycle of the another adjacent backlight block, the weight of the target backlight block, the weight of the adjacent backlight block, and a weight of the another adjacent backlight block, and multiplies the initial duty cycle of the target backlight block and the preliminary coefficient of the target backlight block to generate a preliminary duty cycle; and the backlight module further adjusts the brightness of the target backlight block according to the preliminary duty cycle.

15. The display of claim 14, wherein:

the timing controller further generates an initial duty cycle of the another adjacent backlight block according to the image frame; and the timing controller generates the updated duty cycle of the target backlight block according to the initial duty cycle of the target backlight block, the initial duty cycle of the adjacent backlight block, the initial duty cycle of the another adjacent backlight block, the weight of the target backlight block, the weight of the adjacent backlight block, and the weight of the another adjacent backlight block.

16. The display of claim 9, further comprising a memory configured to store a weighting table;

wherein the timing controller further acquires the weight of the adjacent backlight block from the weighting table according to a position of the adjacent backlight block relative to the target backlight block.

* * * * *